Dec. 1, 1959   A. F. HICKMAN   2,915,306
RUBBER TORSION SPRING
Filed June 24, 1955   2 Sheets-Sheet 1
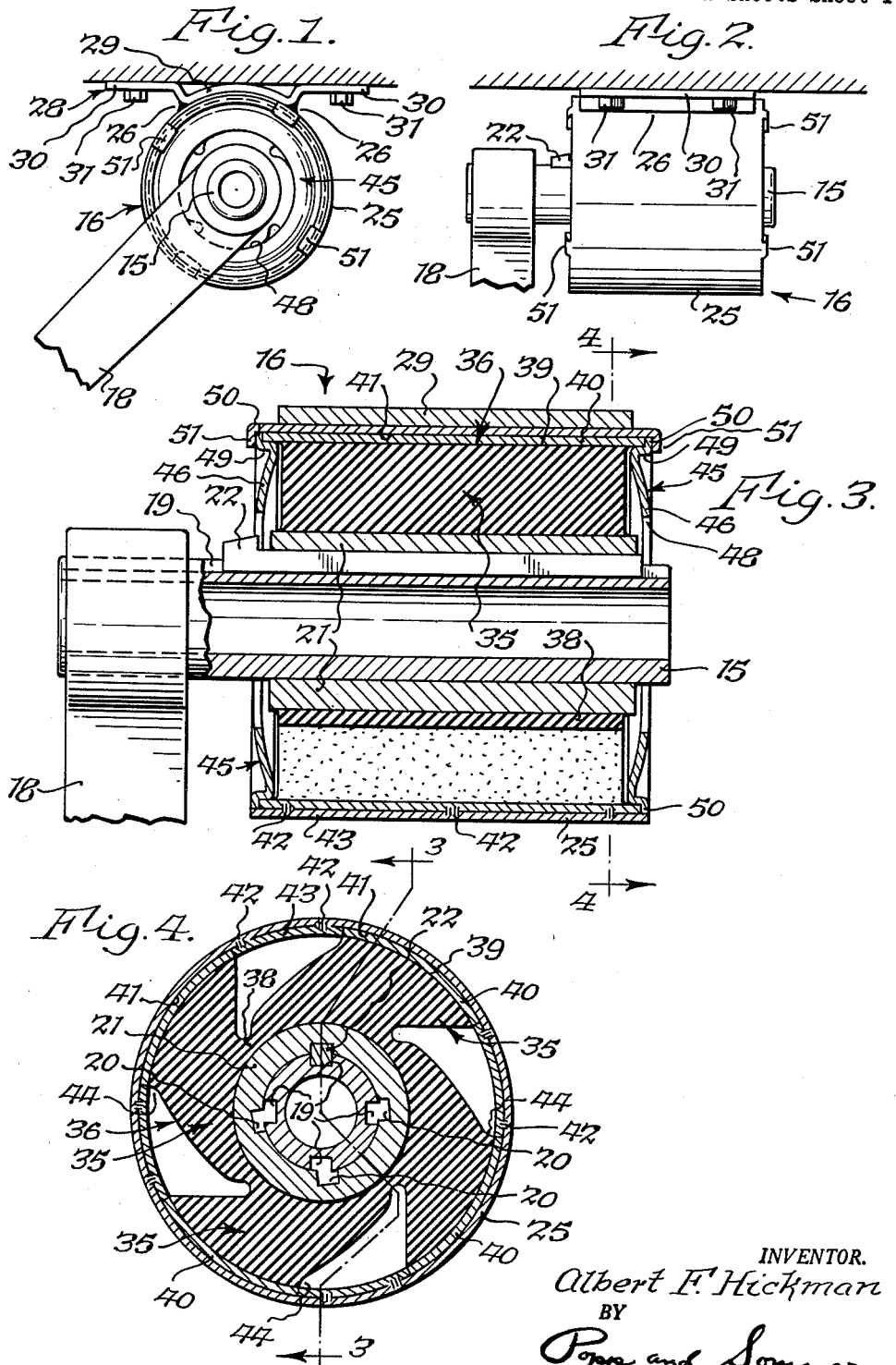
INVENTOR.
Albert F. Hickman
BY
Popp and Sommer
Attorneys.

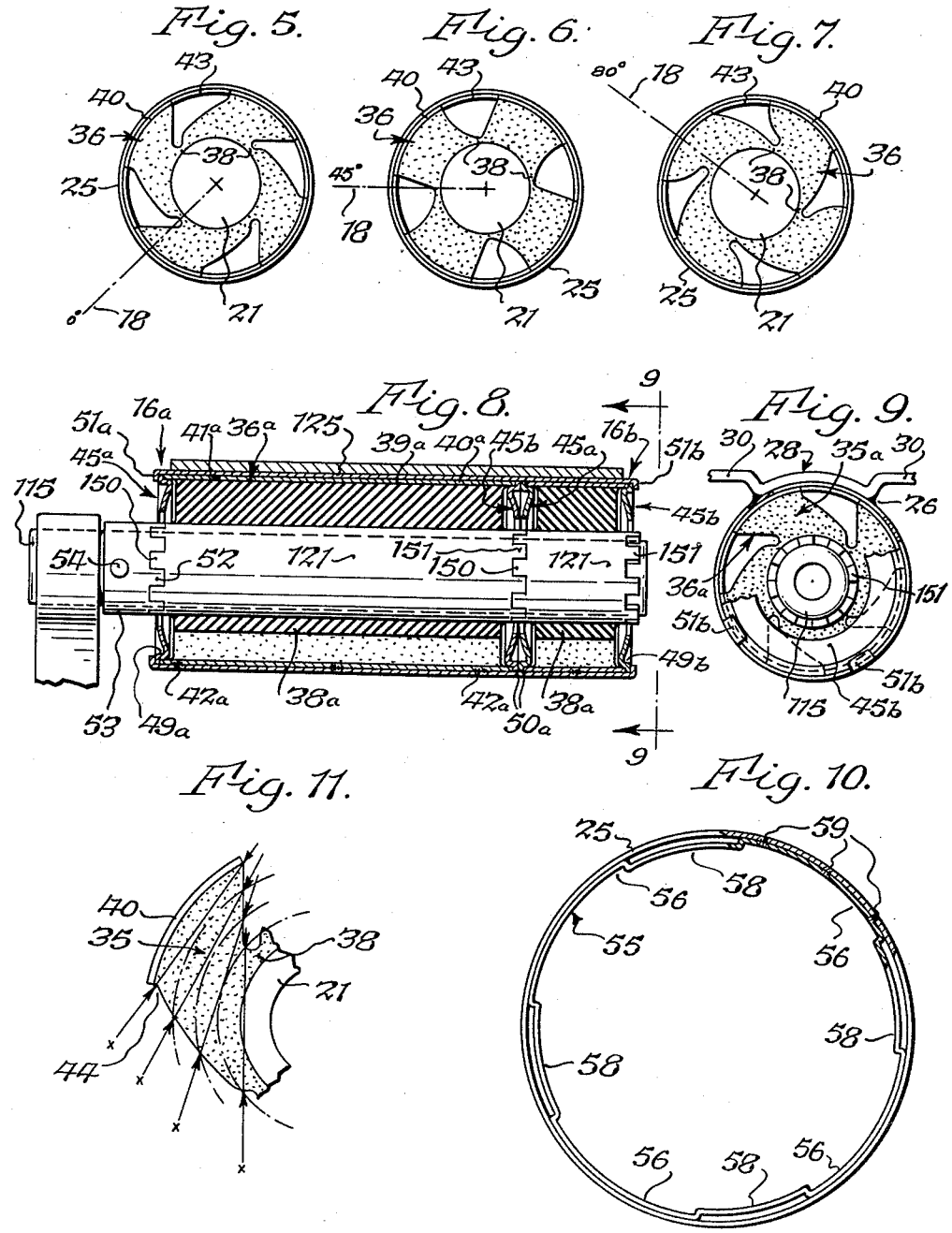

United States Patent Office 2,915,306
Patented Dec. 1, 1959

2,915,306

RUBBER TORSION SPRING

Albert F. Hickman, Eden, N.Y.

Application June 24, 1955, Serial No. 517,767

14 Claims. (Cl. 267—57.1)

This invention relates to a rubber torsion spring of the type in which a rubber body is operatively interposed between an inner hub member and an outer tube member to resist oscillation of these members relative to each other. This type of rubber spring has principally been produced as a solid rubber cylinder vulcanized or otherwise bonded both to the periphery of an axially elongated hub member and also to the bore of the surrounding outer tube member and the present invention is principally directed to overcoming the disadvantages and inefficiency of a rubber spring so constructed.

One of the principal objects of the present invention is to provide such a rubber torsion spring in which all the rubber used is properly and uniformly stressed, this resulting in the requirement for about 50% less rubber than is required in a rubber torsion spring having a solid cylindrical body of rubber as above described.

Another object is to provide such a rubber torsion spring which has an increased degree of angular deflection within safe working limits as compared with the above rubber torsion spring having a solid cylindrical body of rubber. In the rubber torsion spring forming the subject of the present invention, the allowable angular deflection of the outer part of the rubber body can be twice the radial thickness of the rubber body.

Another object of the invention is to provide such a rubber torsion spring in which the bond stresses between the rubber body and the inner hub member are equal to the bond stresses between the rubber body and the surrounding outer tube member.

Another object is to provide such a rubber torsion spring having a maximum degree of flexibility circumferentially.

Another object is to provide such a rubber spring which will develop less heat than a conventional rubber torsion spring having a solid cylindrical body as above described and in which the heat is more rapidly dissipated.

Another object of the invention is to provide such a rubber torsion spring which is light in weight.

Another object is to provide such a rubber torsion spring which can be produced in large quantities in conventional rubber molding apparatus and can be readily assembled into finished form.

Another object is to provide such a rubber torsion spring which can be composed of units of different axial lengths connected in tandem. By this means, it is possible to produce only a few sizes of rubber torsion springs and to use different combinations of sizes, in tandem, to produce heavy-duty springs.

Another object is to produce such a rubber torsion spring which is less costly than other rubber torsion springs now on the market.

Another object is to provide such a multiple torsion rubber spring assembly in which the units can be severally tested so that any defect results in the discard of only one unit and not the entire assembly.

Other objects and advantages will be apparent from the following description and drawings in which:

Fig. 1 is an end elevational view of a rubber torsion spring embodying the present invention and showing a crank shaft and crank arm applied to its inner hub member.

Fig. 2 is a side elevational view thereof.

Fig. 3 is a vertical longitudinal sectional view, on an enlarged scale, taken on line 3—3, Fig. 4.

Fig. 4 is a transverse sectional view taken generally on line 4—4, Fig. 3.

Figs. 5, 6 and 7 are schematic end elevational views of the hub member, its crank arm, the outer tube member and the rubber body interposed between the hub member and tube member and showing the movement of the rubber under different load conditions. In Fig. 5, the rubber body is unstressed. In Fig. 6, the rubber body is partly stressed to about half of its maximum load. In Fig. 7, the rubber body is under maximum stress.

Fig. 8 is a view similar to Fig. 3 but showing a modified form of the invention in which a pair of rubber spring units embodying the present invention are connected in tandem to act cumulatively in providing resilient resistance.

Fig. 9 is a fragmentary end elevational view viewed from the right-hand end of Fig. 8.

Fig. 10 is an end elevational view, partly in section, of the outer tube member of the rubber spring and showing a modification of the arrangement for providing longitudinally extending pockets therein.

Fig. 11 is a fragmentary end elevational view of a hub member and one block-like arm of its rubber body and illustrating that this arm is of uniform effective cross sectional area throughout its radial length.

In the form of the invention shown in Figs. 1–7, the numeral 15 represents a metal crank shaft which can be of tubular form and which projects from one end of the rubber spring unit which is indicated generally at 16. A crank arm 18 is shown as secured to the projecting end of the crank shaft 15 and this is illustrated, diagrammatically, by the dot-dash line shown in Figs. 5, 6 and 7. The crank shaft 15 is shown as having four spline grooves 19, any one of which is arranged to be brought into register with one of four spline grooves 20 in the metal inner hub member 21 of the rubber spring. A spline 22 can be used in any selected pair of spline grooves 19, 20 and preferably the circumferential spacing of the spline grooves 19 is different from the circumferential spacing of the spline grooves 20 so that by the selection of different pairs of these spline grooves, different degrees of pre-stressing or "windup" can be built into the rubber spring unit.

The rubber spring unit also includes an outer tube member 25 which can be made of relatively thin gage steel or other metal and is preferably of cylindrical form. This outer tube member can be welded, as indicated at 26, to a sheet metal bracket 28 having a curved central part 29 fitting the periphery of the tube 25 at one side thereof and having a pair of attaching ears 30 extending tangentially. These ears 30 can be secured as by bolts 31 to a support.

The inner hub member 21 extends coaxially through the outer tube member 25 and the resilient resistance restraining oscillation of the inner hub member 21 relative to the outer tube member 25 about their common axis comprises a plurality of block-like rubber arms 35 operatively interposed in the space between the inner hub member 21 and the outer tube member 25 and forming part of a one-piece or unitary rubber body indicated generally at 36. An important feature of the present invention revolves about the form and operation of this rubber body 36 and its block-like arms 35 of which four are shown, the number being determined by the radial size of the spring unit and the radial extent of the rubber arms 35. As best shown in Fig. 4, the inner ends of these rubber arms are connected by connecting portions 38 of the rubber body 36 and these connecting portions 38 form, with the block-like rubber arms 35, a cylindrical inner portion of the rubber body through which the inner hub member 21 extends. This hub member is bonded, as by vulcanzation, to this inner cylindrical part of the rubber body 36. The block-like rubber arms 35 are separated from one another by voids extending the full length of the block-like rubber arms lengthwise of the axis of the inner hub member 21 and outer tube member 25, and the cross sectional area of these block-like rubber arms, transversely of this axis, is very materially greater than the corresponding cross sectional area of these voids.

To the outer face 39 of each of the block-like arms 35 is bonded, as by vulcanization, a curved or arcuate plate 40, these plates fitting against the bore of the outer tube member 25 and extending longitudinally substantially the full length thereof as illustrated in Fig. 3. These plates 40 are fitted in internal pockets 41 provided in the outer tube member 25 and extending longitudinally thereof. These pockets can be formed by welding, as indicated at 42, spaced curved or arcuate plates 43 in the bore of the outer tube member 25 at substantially spaced intervals.

A most important feature of the invention is that in the unstressed condition of the rubber spring, the block-like rubber arms 35 do not extend radially but are of spiral form, all spiralling in the same direction and in opposition to the rotative force to be applied to the spring unit. This unstressed condition of these rubber arms 35 is illustrated in Figs. 1–5 and in this unstressed condition, it is assumed that the crank arm 18 is at its zero degree or unloaded position in which it extends downwardly and to the left, as viewed in Figs. 1 and 5, at about a 45° angle.

When the spring is stressed about half way, the crank arm 18 is moved to a horizontal position or a distance of about 45°, as illustrated in Fig. 6. In this condition, it will particularly be observed that the block-like rubber arms 35 project radially instead of being of the spiral form shown in Fig. 5. The amount of movement of the crank arm 18 is related to the radial thickness of the rubber arms 35, the greater this thickness, the greater the angular movement of the crank arm.

Under maximum stress condition, the crank arm, with the radial thickness of the rubber arms 35 shown, is moved upwardly another 35 or so degrees to about the 80° position shown in Fig. 7. Under this condition, it will be seen that the several arms 35 have been stressed to spiral in the reverse direction as compared with Fig. 5. In approaching this fully stressed condition, as seen from Fig. 7 as compared with Fig. 5, it will be seen that the front or advancing face of each arm 35 shortens and its trailing face lengthens so that, at the outer end of each arm 35, its leading edge is placed under radially outwardly directed compressive forces transmitted to its plate 40 and at its trailing edge is placed under radially inwardly directed tension forces tending to separate this trailing edge from its plate 40.

It will therefore be seen that by starting with the block-like rubber arms spiralling in one direction and stressing them to spiral in the reverse direction under maximum load conditions, a high degree of angular movement and flexibility can be obtained without overstressing any part of the rubber. In this connection, it will be noted that the bond stress between each block-like rubber arm 35 and the inner hub member 21 is approximately equal to the bond stress between the outer end of each rubber arm and its plate 40, or the outer tube member 25, because the effective area of contact between each rubber arm and the hub member 21 is approximately equal to the effective area of contact between this rubber arm and the surrounding outer tube 25. Rupture of the bond at the inner ends of the rubber arms 35 is minimized by the connecting portions 38 and rupture of the bonds of the outer ends of these arms is minimized by the provision of fillets 44 along one edge of each arm 35 at its outer end.

The plates 40 project a slight distance beyond opposite ends of the block-like rubber arms 35 and are held in their pockets 41 by a pair of end rings 45. These end rings are shown as including an outwardly dished central portion 46 having a large central hole 48 which permits axial movement of the hub member 21 relative to the outer tube member 25.

Each ring 45 has its outer end provided with a radial flange 49 which provides a peripheral portion engaging the inner faces of the plates 40 and 43, particularly to hold the latter against inward displacement from their pockets 41. The outer ends of the axial flanges 49 are flanged radially, as indicated at 50, to engage the ends of the plates 40 and 43. These rings are held in position by ears 51 which project from the ends of the outer tube member 25 and are bent inwardly to engage the radially extending flanges 50 of the rings 45.

As previously indicated, a highly important feature of the invention is that all the rubber used is properly and uniformly stressed. Referring to Fig. 11, the straight lines designated $x$ represent the vectors of forces applied to each rubber arm 35 and the resistive force set up by the arm. It will be observed that the circular dot-dash-lines connecting the opposite end of each straight line of force through the rubber arm are of the same length. Accordingly, from a stress analysis point of view, the rubber arms are of the same effective area throughout their radial length although they assume the usual shapes illustrated in Figs. 5, 6 and 7. Accordingly, all parts of each rubber arm 35 are subjected to the same stress thereby to provide substantially uniform stress throughout the rubber spring, and hence maximum life, serviceability and uniform flexibility. The customary provision of the fillets 44 merely increases the bond area at the outer end of each rubber arm 35 to conform with the endless bond at the inner ends of the arm 35 and do not appreciably affect the stress of the rubber arm.

A feature of the invention is that the spring unit can be made by standard rubber molding and rubber-metal assembly operations using principally metal stamping. Thus, there is no difficulty in providing a mold for producing the rubber body 36 vulcanized to the inner hub member 21 and to the outer plates 40. In this molding, a vulcanized bond is provided between the rubber and the metal parts and with such vulcanization, there is no danger of bond failure in any normal usage of the rubber spring at its rated capacity.

After the molding is complete, the molded rubber and metal parts can be forced through a tube (not shown) of axially diminishing internal size so that the rubber arm 35 and their plates 40 are compressed axially inwardly and the effective diameter of the rubber body 36 and its plates 40 reduced. From the small end of this tube, the rubber body 35 and its plates 40 are forced into the outer tube member 25, the plates 40 being alined to enter the pockets 41. Accordingly, when the rubber body 35, together with its hub member 21 and plates 40 vulcanized thereto, are forced into the outer tube member 25, the rubber is under an initial compression.

The end rings 45 are then applied with their axial flanges 49 holding the plates 40 against inward movement under the forces to which the rubber spring is subjected. The ears 51 are bent inwardly to hold these rings in position and the spring unit is ready for use.

Comparing the rubber torsion spring of the present invention with a conventional rubber spring in which the rubber 35 is a cylindrical body substantially completely filling the space between and having an endless cylindrical bond with both the inner hub member 21 and the outer tube member 25, with such a conventional rubber torsion spring, the amount of angular deflection obtainable is wholly a function of the rubber near the inner hub member. Thus, since such conventional rubber torsion spring has a great excess of rubber near the outer tube member, if this excess of rubber were properly stressed, the rubber near the inner hub member would be overstressed. Also, with such excess of rubber near the outer tube member, in the use of a conventional rubber torsion spring, the excess of rubber is only flexed about half as much as the rubber near the inner hub member and hence the angular deflection obtainable with such a conventional rubber torsion spring is less than that obtainable with the present rubber torsion spring where all portions of the rubber are uniformly stressed to the same degree. Due to this excess of rubber near the outer tube member in conventional rubber torsion springs, practicable designing limits the radial thickness of the rubber to relatively small amounts, well under one inch, since the excess of rubber in the outer portion of the body increased at a geometric rate with increases in the radial thickness of the rubber. In the present rubber torsion spring, since there is no such excess of rubber, there is no such limitation in design and hence the rubber body 36 can have any radial thickness. Since, as previously stated, the angular movement of the rubber torsion spring is directly related to the radial thickness of the rubber body, the present rubber torsion spring can be designed to produce at least twice the angular movement now possible with such conventional rubber torsion springs and with full efficiency.

In Figs. 8 and 9 is illustrated a modification of the invention in which any desired number of rubber spring units constructed generally as shown in Figs. 1–7 can be coupled in tandem or in multiple to provide their cumulative effect in resiliently resisting torsional movement. For example, individual spring units having a length of 6, 7, 8, 9, 10 and 11 inches can be used in tandem or multiple to provide springs having effective lengths of 12, 13, 24, 38 inches, etc. By this provision, it is possible to make a relatively small number of individual spring units and at the same time meet widely different heavy load requirements. Also, the individual units can be tested and if one is found defective, the loss is limited to one unit and does not extend to the entire spring assembly.

In Fig. 8 are illustrated two spring units which are designated at 16a and 16b although any number could be employed. Except for the inner hub member and the outer tube member, these units 16a and 16b are identical with the form of the invention shown in Figs. 1–7 and hence the same reference numerals have been employed and distinguished by the suffix "a" and "b" and a detailed description of these parts will not be repeated.

As to these inner hub and outer tube members, each hub member 121 has its opposite ends projecting through the end rings 45a and 45b and these projecting ends are formed to provide square axially extending face jaws 150 and 151 which mate with one another so that the hub members can be coupled end to end, as illustrated in Fig. 8 and rotate as a single unit. At one end of the group of spring units, the face jaws 150 mate with axially extending face jaws 52 on a drive collar 53. This collar 53 can be secured, as by a pin 54, to the crank shaft 115.

The outer tube 125, which corresponds to the outer tube 25 of the form of the invention shown in Figs. 1–7, is common to all of the spring units 16a, 16b, etc. As with the form of the invention shown in Figs. 1–7, this common outer tube member is provided with end ears 51a and 51b which engage the end rings 45a and 45b of the rubber spring units 16a and 16b respectively and this common outer tube member 25 is welded, as indicated at 26, to an attaching bracket 28 having ears 30 by means of which it can be secured to a support.

It will be seen that by connecting the spring units 16a, 16b as illustrated in Figs. 8 and 9, any required amount of resilient resistance can be provided by suitable selection of the number and size of spring units so coupled together.

The modified form of the invention shown in Fig. 10 illustrates another manner in which pockets, corresponding to the pockets 41, of the form of the invention shown in Figs. 1–7, can be provided longitudinally along the inner surface of the outer tubular member 25. Instead of having the individual plates 43 to provide such pockets 41, as illustrated in Figs. 1–7, a continuous liner shell 55 can be fitted inside of the outer tube member 25 and this liner 55 can be provided at spaced intervals with inwardly offset portions 58 to provide axially extending pockets 56 which correspond to the pockets 41 of the form of the invention shown in Figs. 1–7. At suitable intervals, the liner 55 can be spot welded, as indicated at 59, to the outer tube member 25. It will be seen that this manner of providing pockets for the reception of the plates 40 is as effective as the manner illustrated in Figs. 1–7 and the operation of the rubber torsion spring is not affected by this change of design.

From the foregoing, it will be seen that the present invention provides a rubber torsion spring utilizing the minimum amount of rubber and hence having a minimum weight and cost since all of the rubber used is properly and uniformly stressed. It will further be seen that by the spiral unstressed form of the arms 35, it is possible to provide a high degree of angular movement of the torsion spring since these arms pass through an intermediate radially extending position to a reversely spiral position. It will therefore be seen that the present invention provides a spring accomplishing the various objectives and having the various advantages previously indicated in addition to being capable of being assembled in multiple as illustrated in Figs. 7 and 8.

I claim:

1. A rubber torsion spring for yieldingly resisting the movement of an oscillating part with reference to another part, comprising an inner metal hub member adapted to be secured to one of said parts, an outer metal tube member concentric with and surrounding said inner hub member in spaced relation thereto, said members being capable of oscillating relative to each other about their common axis, and a plurality of block-like rubber arms operatively connected to the periphery of said inner hub member and to the bore of said outer tube member, said block-like arms being separated from one another by voids extending the full length of said block-like arms lengthwise of said axis and the cross sectional area, transversely of said axis, of said block-like rubber arms being very materially greater than the cross sectional area of said voids, said arms in the unstressed condition of the spring being of spiral form and said arms spiralling outwardly in the same direction and in the direction opposite to the rotative force to be applied to the spring whereby said arms are brought to radially extending positions when the spring is partly stressed and said arms are brought to reversely spiralling positions when said spring is fully stressed whereby the rubber torsion spring has an angular deflection well in excess of 45°.

2. A rubber torsion spring as set forth in claim 1 wherein a plurality of separate plates are severally vulcanized to the outer ends of said arms in generally concentric relation to one another and wherein means secure said plates against the bore of said outer tube member, the outer end of each rubber arm, in the stressing of the spring, developing radially inwardly directed tension forces along its trailing edge tending to separate said trailing edge from said plate and developing radially outwardly directed compression forces against said plate along its leading edge.

3. A rubber torsion spring as set forth in claim 2 wherein said outer tubular member is provided with internal axially extending pockets and wherein said plates are severally fitted in said pockets.

4. A rubber torsion spring as set forth in claim 3 wherein circumferentially spaced axially extending plates are welded to the bore of said outer tube member to provide said pockets.

5. A rubber torsion spring as set forth in claim 3 wherein a ring is arranged in said outer tube member, and has a peripheral portion engaging those faces of said plates which oppose said axis to hold them against inward displacement from said pockets.

6. A rubber torsion spring as set forth in claim 5 wherein ears extending from said outer tube member are bent over said ring to retain said ring in engagement with said plates.

7. A rubber torsion spring as set forth in claim 2 wherein a pair of tubes of similar diameter form said inner hub member and wherein axially extending end jaws at opposing ends of said pair of tubes couple said pair of tubes in tandem.

8. A rubber torsion spring as set forth in claim 7 wherein a single outer tube member is common to the pair of tubes so coupled in tandem forming said inner hub member.

9. A rubber torsion spring or the like, comprising an inner hub member and an outer tube member concentric with and surrounding said inner hub member in spaced relation thereto, said members being capable of oscillating relative to each other about their common axis, a plurality of block-like, rubber arms connected with the periphery of said inner hub member, said outer tubular member being provided with internal axially extending pockets corresponding in number and arrangement to said arms and a plurality of separate plates severally vulcanized to the outer ends of said arms and fitted in said pockets, the outer end of each rubber arm, in the stressing of the spring, developing radially inwardly directed tension forces along its trailing edge tending to separate said trailing edge from said plate and developing radially outwardly directed compression forces against said plate along its leading edge.

10. A rubber torsion spring or the like as set forth in claim 9 wherein rubber connecting portions integrally unite the inner ends of said arms to provide a unitary rubber body having a tubular central part embracing said hub member, and wherein said tubular central part is vulcanized to said hub member.

11. A rubber torsion spring or the like as set forth in claim 9 wherein circumferentially spaced axially extending plates are welded to the bore of said outer tube member to provide said pockets.

12. A rubber torsion spring or the like as set forth in claim 9 wherein a ring is arranged in said outer tube member and has a peripheral portion engaging those faces of said plates which oppose said axis to hold them against inward displacement from said pockets.

13. A rubber torsion spring or the like as set forth in claim 12 wherein an annular flange extends radially outwardly from the peripheral portion of said ring and engages the ends of the plates.

14. A rubber torsion spring or the like as set forth in claim 13 wherein ears extending from said outer tube member are bent over said ring to retain said ring in engagement with said plates.

References Cited in the file of this patent

UNITED STATES PATENTS

| 1,749,393 | Pflimlin | Mar. 4, 1930 |
| 1,924,269 | Brown | Aug. 29, 1933 |
| 1,993,260 | Burns | Mar. 5, 1935 |
| 2,088,341 | Rabe | July 27, 1937 |
| 2,088,342 | Rabe | July 27, 1937 |
| 2,126,708 | Schmidt | Aug. 16, 1938 |
| 2,468,311 | TeGrotenhuis | Apr. 26, 1949 |
| 2,510,644 | McCormick | June 6, 1950 |
| 2,590,711 | Krotz | Mar. 25, 1952 |
| 2,603,267 | Simpson | July 15, 1952 |

FOREIGN PATENTS

| 465,394 | Great Britain | May 6, 1937 |